United States Patent Office 3,630,946
Patented Dec. 28, 1971

3,630,946
METHOD OF PREPARING RARE EARTH METAL ORTHOVANADATE PHOSPHOR
Richard C. Ropp, Warren, and Raymond Oakley, Newark, N.J., assignors to Westinghouse Electric Corporation, Pittsburgh, Pa.
No Drawing. Filed Nov. 18, 1969, Ser. No. 877,858
Int. Cl. C09k 1/44
U.S. Cl. 252—301.4 R                    8 Claims

ABSTRACT OF THE DISCLOSURE

An improved method of precipitating the raw-mix constituents of rare earth metal orthovanadate phosphor from aqueous solution, and preparing a superior rare earth metal activated rare earth metal orthovanadate composition. The constituents are dissolved in acid solution, with vanadium pentoxide being dissolved in concentrated hydrochloric acid to provide a high concentration of vanadyl radical in solution. Predetermined amounts of hydroxyl radical containing compound and sodium perborate are admixed with the rare earth metal and vanadium containing acid solutions so that the pH of the resulting mixture is at least 7.5 to provide a condition under which rare earth metal orthovanadate is very efficiently precipitated. The precipitant is calcined to provide an activated, efficient rare earth metal orthovanadate phosphor.

BACKGROUND OF THE INVENTION

Rare earth metal orthovanadate phosphors, particularly europium activated yttrium orthovanadate, are efficient luminescent materials having wide applications ranging from their use as a component in color television applications to acting as a color correcting phosphor in high pressure mercury vapor lamps. The vanadate phosphors in general exhibit a broad excitation characteristic which accounts for their variety of uses.

Precipitation techniques have been used in the preparation of rare earth metal orthovanadates with varying results. In general, the efficiency of the phosphors produced and the yield have been limited. In the prior art techniques, the rare earth metal constituents were dissolved in acid solution and admixed with a pentavalent vanadium-containing aqueous solution prepared by dissolving one of the more readily soluble vanadium compounds in water. A sufficient amount of a base material was then added to raise the pH of the resulting mixture in order to precipitate out a vanadate complex which included the orthovanadate and other vanadate species. The water soluble vanadium compounds are only limitedly soluble and the vanadium ion molar concentration in solution is limited, which facts combine to impair the efficiency of the precipitation process. Thus recycling of the solution is required in order to utilize the costly rare earth metals contained therein. Further, the precipitant obtained by these prior art methods typically included various vanadate complexes in addition to the orthovanadate, and this requires adding a quantity of vanadium containing flux to the precipitant before firing to insure that the phosphor raw mix to be fired conformed to the orthovanadate formulation. The formation of orthovanadate during solid state firing has attendant therewith the difficulties in achieving uniformity of product and good stoichiometry involved in a solid state process.

An improved method of precipitating rare earth metal orthovanadate phosphor from aqueous solution is disclosed in copending application Ser. No. 808,320 filed Mar. 18, 1969, assigned to the assignee of the present application. This copending application teaches precipitation of the orthovanadate wherein the vanadium is supplied to the solution by dissolving vanadium pentoxide in concentrated hydrochloric acid to provide a vanadyl radical containing acid solution to which is admixed predetermined amounts of the rare earth metal ion containing solution and amounts of ammonium hydroxide, and hydrogen peroxide.

SUMMARY OF THE INVENTION

It is an object of the present invention to provide a superior method of preparing rare earth metal orthovanadate phosphors.

It is another object to increase the efficiency of precipitation to make the production of the orthovanadate phosphors more economical.

It is still another object to prepare rare earth metal orthovanadate phosphor which is a superior luminescent material having a white body color.

These objects and others which will become apparent as the description proceeds are achieved by the method which comprises dissolving a predetermined amount of vanadium pentoxide in a concentrated solution of hydrochloric acid to provide a vanadyl radical containing acid solution, and admixing with the vanadyl radical containing acid solution predetermined amounts of rare earth metal ion containing acid solution, predetermined amounts of hydroxyl radical containing compound and a predetermined amount of sodium perborate. The ratio of vanadyl radical in solution to rare earth metal ion in solution is preferably about 1:1 so that substantially only the orthovanadate is precipitated. The amount of hydroxyl radical containing compound is sufficient to raise the pH of the resulting mixture to a value at least greater than 7.5. The gram mol ratio of hydroxyl radical to sodium perborate is from about 10:1 to 1:1, and the rate of addition of said hydroxyl radical is such as to effect an approximately constant rate of change of pH in the resulting mixture. The resulting mixture is maintained at a predetermined temperature whereby the rare earth metal orthovanadate is efficiently precipitated. When ammonium hydroxide is utilized the precipitant includes an amount of yttrium borate, which acts as a flux during firing of the precipitant and which contributes to producing a more efficient luminescent material having a crystalline white body color. The precipitant is calcined in an oxidizing atmosphere at from 800 to 1400° C. for at least two hours, after which the material is water washed to remove the soluble sodium compounds which remain.

DESCRIPTION OF THE PREFERRED EMBODIMENT

A 1.05 molar concentration solution of vanadyl radical containing solution is prepared by dissolving 0.525 mol of vanadium pentoxide in one liter of concentrated hydrochloric acid, which is about 30% by weight hydrochloric acid. A second solution, which is a 1 molar concentration solution of rare earth metal ion, is prepared by dissolving 0.465 mol of yttrium oxide and 0.035 mol of europium oxide in 550 millimeters of concentrated hydrochloric acid, which is 30% by weight hydrochloric acid, after which distilled water is added to bring the solution to 1 liter. A third solution is prepared by mixing about 200 grams of sodium hydroxide and about 77 grams of hydrated sodium perborate ($NaBO_3 \cdot 4H_2O$), and dissolving these constituents in 1 liter of distilled water. One then places about 5 liters of the vanadyl radical containing acid solution in a glass lined reaction tank and dilutes with about 5 liters of deionized water. Add to the reaction tank 5 liters of the rare earth metal ion containing solution, and about 5 liters of deionized water, stirring continuously and heating the resulting mixture to about 70° C., at which temperature the constituent yield is optimized. The perborate and sodium hydroxide containing mixture is then added to the already mixed vanadyl radical containing one rare earth metal ion containing acid solution. The rate of addition of the sodium hydroxide and sodium perborate is such that the pH of the resulting mixture is increased at a steady rate, for example the rate of addition is about 50 millimeters per minute and the final pH is about 10.5. The resulting mixture is stirred continuously and heated to about 70° C. for about 45 minutes during which time the precipitant forms. After allowing the solution to cool and precipitate to settle, the precipitant is filtered and separated from the aqueous mother liquor. The dried precipitate is then loaded into trays with a large exposed surface area and fired in air or other such oxidizing atmosphere for about 6 hours at about 1200° C. The precipitate substantially comprises yttrium-europium orthovanadate. After the fired material cools it is ready to be water washed to remove soluble sodium compounds.

In the foregoing example the yttrium can be substituted for in whole or in part by lanthanum and/or gadolinium, and europium can be substituted for in whole, or in part by other lanthanide series rare earth metals such as dysprosium, samarium, cerium and terbium, in an activating proportion.

It has been found that the use of sodium perborate, i.e., $NaBO_3 \cdot 4H_2O$, is a superior oxidizing agent to the hydrogen peroxide which has been used in the prior art. The use of the sodium perborate results in a very white body colored final product which has a high luminescent efficiency. The sodium hydroxide can be substituted for by ammonium hydroxide which is slightly more expensive. The use of sodium hydroxide and sodium perborate allows one to use higher concentration solutions in precipitating the orthovanadate. Thus, one can use a two molar concentration solution of rare earth metal and vanadyl radical in the present method, whereas in the earlier aforementioned copending application the molar concentrations were about 1 molar. The use of higher concentrations of reactants allows for increased economy of production.

The foregoing description of the method of the preferred embodiment of practicing the invention teaches the addition of the rare earth metal acid solution to the vanadyl radical containing acid solution followed by the simultaneous addition of the sodium hydroxide and sodium perborate solution at a fairly constant rate. This particular ordered addition of reactants is observed to result in the best output luminescent composition after firing.

In practicing the method of the present invention a precipitant will form when the pH of the resulting mixture is at least greater than about 7.5 but the pH is preferably raised to a value of about 10.5 whereby the resulting precipitant substantially comprises only rare earth metal orthovanadate as the vanadate species.

We claim as our invention:

1. The method of making $LnVO_4$:Ln' phosphor, wherein Ln is at least one of yttrium, lanthanum, and gadolinium, and Ln' is at least one lanthanide series rare-earth metal in an activating proportion, which method comprises:

(a) dissolving a predetermined amount of vanadium oxide in concentrated hydrochloric acid to form a vanadyl-radical-containing acid solution;

(b) mixing with said vanadyl-radical-containing solution a hydrochloric acid solution containing Ln and Ln' ions, with the ratio of vanadyl-radical to total Ln plus Ln' ions being at least 1:1;

(c) adding to said mixed solution at an approximately constant rate a basic solution of sodium perborate and ammonium hydroxide or sodium hydroxide, wherein the gram-mol ratio of hydroxyl-radical to perborate is from about 10:1 to 1:1, until the pH of the resulting mixture is raised to at least 7.5, with the resulting mixture heated to a predetermined temperature sufficient to precipitate therefrom Ln, Ln' orthovanadate, and also sodium chloride which acts as a flux upon calcining of the orthovanadate when sodium hydroxide is used, and Ln metal perborate which acts as a flux upon calcining of the orthovanadate when ammonium hydroxide is used;

(d) separating said precipitate from the residual mother liquor; and (e) calcining the resulting precipitate at a predetermined temperature for sufficient time in an atmosphere comprising oxygen to form said phosphor, and after said phosphor cools washing said phosphor to remove residual soluble products.

2. The method as specified in claim 1, wherein the amount of sodium hydroxide added is sufficient to raise the pH of the resulting solution to a value of preferably about 10.5.

3. The method as specified in claim 1, wherein when sodium hydroxide is utilized to supply the hydroxyl radical the said rare-earth metal ion containing solution and said vanadyl radical containing solution preferably are about 2 molar concentration.

4. The method as specified in claim 1, wherein the ratio of vanadyl radical to rare-earth metal ion in the admixed solution is about 1:1 whereby substantially all of said precipitant is rare-earth metal orthovanadate.

5. The method as specified in claim 1, wherein said rare-earth metal containing acid solution is preferably added to said vanadyl radical containing solution, and thereafter simultaneously adding said sodium hydroxide and said sodium perborate.

6. The method as specified in claim 1, wherein the precipitate is calcined at from 800° C. to 1400° C., for at least two hours, in an oxidizing atmosphere.

7. The method as specified in claim 1, wherein the gram mol ratio of hydroxyl radical to sodium perborate is preferably about 8:1.

8. The method as specified in claim 1, wherein the resulting mixture is maintained at about 70° C. to optimize the yield of rare-earth metal orthovanadate.

References Cited

UNITED STATES PATENTS

| 3,458,450 | 7/1969 | Kobayashi et al. | 252—301.4 R |
| 3,484,381 | 12/1969 | Yale et al. | 252—301.4 R |
| 3,484,382 | 12/1969 | Durkee | 252—301.4 R |
| 3,507,803 | 4/1970 | Wanmaker et al. | 252—301.4 R |

ROBERT D. EDMONDS, Primary Examiner

U.S. Cl. X.R.

23—23, 24, 51